FIG. 1

INVENTOR:
ARTHUR C. FIRL
BY
Arthur C. Firl

June 21, 1960

A. C. FIRL

2,941,518

APPARATUS AND METHOD FOR CONTROLLING TEMPERATURE
OF FURNACE GASES, TUBE METAL AND STEAM

Filed Dec. 17, 1957

INVENTOR:
ARTHUR C. FIRL
BY

United States Patent Office 2,941,518
Patented June 21, 1960

2,941,518

APPARATUS AND METHOD FOR CONTROLLING TEMPERATURE OF FURNACE GASES, TUBE METAL AND STEAM

Arthur C. Firl, Ridgefield Park, N.J., assignor to Combustion Engineering, Inc., New York, N.Y., a corporation of Delaware Filed Dec. 17, 1957, Ser. No. 703,330

12 Claims. (Cl. 122—235)

This invention relates generally to apparatus and method of burning finely divided fuel in liquid, solid or gaseous form in a furnace chamber, specifically, in the water-cooled furnace of a stem generator in which water is evaporated and the steam is superheated for power generation or other uses.

The invention is more particularly concerned with controlling the temperature of the furnace gases, metal temperature of superheating tubes and steam temperature by firing of finely divided fuel in a manner which is generally known as tilting turbulent firing, one such method being disclosed in the U.S. patent issued to H. Kreisinger et al., No. 2,363,875. This patent teaches the burning of comminuted fuel in a furnace by discharging through the furnace wall, streams of fuel and air in directions tangential to an imaginary vertical firing cylinder centrally located within the furnace chamber, and by way of burners which are tiltable in a vertical plane. This is generally known as vertical tangential firing with tilting burners.

When firing fuel in the above manner a whirling mass of gases is produced taking the form of a vertically elongated and horizontally rotating body of gases. These gases usually rise toward the furnace top in following a spiral path, and generally leave the furnace chamber by way of gas outlet leading into a horizontally disposed passage.

In an installation of the above type in which vertical tangential firing is employed, the gas distribution across the furnace in the upper part thereof becomes unbalanced, causing more gas to flow on one side of the furnace than on the other and producing gas temperatures which are higher on one side of the gas outlet than on the opposite side. It was found that this is largely due to the spin-action of vertical tangentail firing and results in nonuniform gas temperatures entering the superheater and other heating surfaces that are provided near the furnace gas outlet or in gas passages beyond the furnace chamber. Such unequal temperatures if uncontrolled are undesirable since they result not only in excessive heat transfer from the gases to the working fluid at inexpedient places, but in many cases have contributed to the overheating and failure of steam heating tubes.

The beneficial features of tilting turbulent firing of pulverized, liquid or gaseous fuels are highly important in boiler operation and are well known. Because of the high turbulence created such firing promotes complete and intense combustion of the fuel within the furnace chamber. It further results in high heat transfer rates between the combustion gases and the heating surfaces of the furnace walls. Accordingly, it is exceedingly desirable to find ways and means whereby tilting turbulent firing can be employed in a manner which would result in a gas flow and gas temperature pattern across the furnace width which can be adjusted at will during operation of the furnace to meet varying operating conditions such as those caused by deposits of slag on the furnace walls.

It is therefore a primary object of the invention, while maintaining the benefits of tilting tangential fuel burning, to produce a gas flow and gas temperature pattern which can be maintained substantially uniform across the furnace width in the face of unequal heat absorbing requirements or capacities of the furnace walls.

It is another important object of the invention to provide an apparatus and method for firing finely divided fuel in a furnace in a tilting tangential manner which results in a stream of gases the distribution and temperature thereof across the width of the furnace can be changed at will to accommodate heating requirements of surfaces located in the top portion of the furnace chamber or in gas passages that follow the furnace chamber.

Another object of the invention is to control and equalize in a tangentially fired furnace the metal temperatures of steam heater tubes and the temperatures of the steam heated therein.

Other and further objects of the invention will become apparent to those skilled in the art from the detailed description thereof when taken in conjunction with the accompanying drawings wherein:

Figs. 10 and 11 are diagrammatic elevational sections of the steam generator illustrated in Fig. 1; Fig. 10 showing the forming of a flaming gas mass of high concentration and intensity by directing the fuel and air streams towards a firing circle of small diameter; and Fig. 11 showing the forming of a flaming gas mass of larger periphery by discharging fuel and air through burners in a direction tangential to a large firing circle;

Fig. 24 is a plan view taken on line 24—24 of Fig. 1 showing how individual burner nozzles or groups thereof are tilted in response to steam temperatures taken at superheater elements similarly located with respect to the side walls as are the corresponding burner nozzles;

Figs. 25 and 26 are elevational views of a steam generator furnace showing in diagrammatic form the producing of two bodies of rotating gases by employing the herein disclosed horizontal tangential system of firing comminuted fuel. Fig. 25 shows both bodies of gases rotating in counterclockwise direction, whereas Fig. 26 shows one body of gas rotating in clockwise direction and the other in counterclockwise direction.

Figure 1:
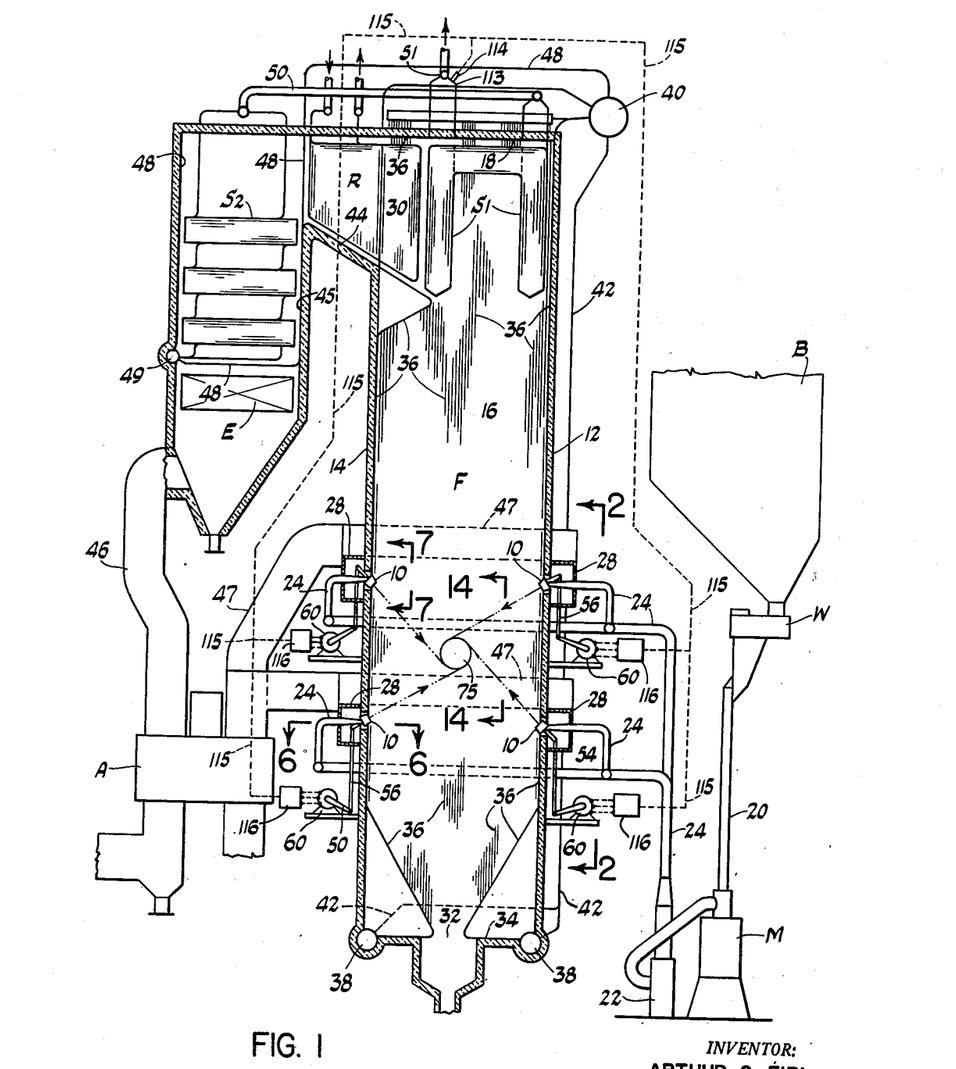
Fig. 1 shows a steam generator having an upright furnace chamber that is equipped with my herein disclosed horizontal arrangement of tangentially fired tiltable burners.
Figure 2:
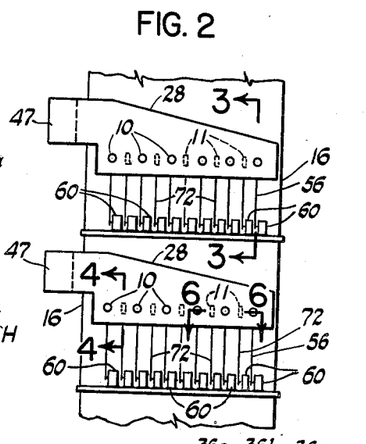
Fig. 2 is a front elevational view of a portion of the steam generator taken on lines 2—2 of Fig. 1, and illustrates the herein disclosed novel horizontal arrangement of rows of tangentially fired burners.
Figures 3, 5:
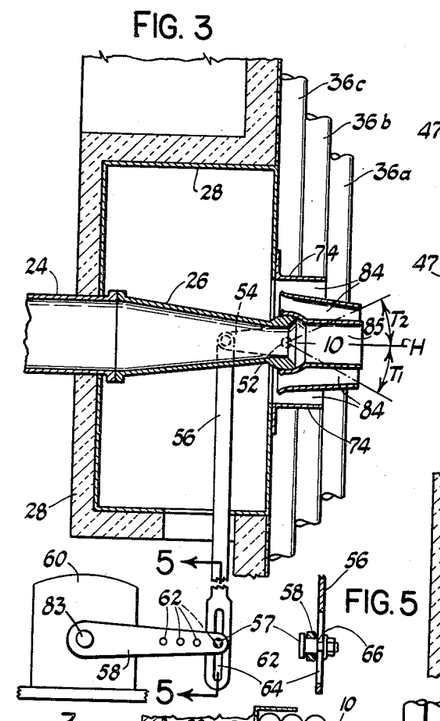
Fig. 3 is an enlarged sectional view taken on line 3—3 of Figs. 2 and 6, of the fuel nozzles and the environment thereof as mounted in the furnace wall.
Fig. 5 is a section through the adjusting device provided at the lower end of the nozzle tilting rod, taken on line 5—5 of Fig. 3.

In the preferred embodiment shown in Figs. 1 and 2, fuel and air is being discharged through fuel nozzles generally designated 10 and air nozzles 11 into a furnace chamber F bounded by front wall 12, rear wall 14, side walls 16, and a roof 18. From a fuel bunker B the fuel is delivered to a weighing apparatus W and to a pulverizer M by way of fuel pipe 20. After having been pulverized to a desired fineness, a mixture of fuel and air is delivered to each fuel nozzle 10 by means of exhauster 22 and fuel pipes 24. As shown in Fig. 3 these pipes are connected to a transmission piece 26, transforming the circular cross-section of pipe 24 to a rectangular cross-section of the fuel nozzle 10. Heated air for burning the fuel enters the furnace through hot air duct 28 and air nozzles 11, see Fig. 2.

The combustion gases produced within the furnace F rise to the top of the furnace and pass through a gas offtake or furnace outlet 30 formed in the upper portion of the rear wall 14 directly below roof 18. Ash in solid or liquid form is removed through ash discharge opening 32 provided in the floor 34 of the furnace F. The walls, roof and floor of the furnace chamber are lined with water cooled tubes 36 receiving water from headers 38 arranged along the sides of the bottom of the furnace. These headers in turn are supplied with water from a steam and water drum 40 by way of downcomer tubes 42. Steam is generated in the water wall tubes 36 of the furnace and is discharged together with recirculated water into drum 40 wherein the steam is separated from the water by well known means (not shown). A high temperature superheater section S1 is arranged in the upper portion of the furnace F. The combustion gases flow over and give up heat to the superheater S1 before entering the furnace offtake 30 and before passing over reheater section R disposed in the horizontal gas pass 44 leading into a downwardly extending vertical gas pass 45. A low temperature superheater section S2 is arranged in gas pass 45 and is followed by an economizer section E, a duct 46, and an air heater A, in the order named. Upon leaving the air heater A the gases pass into the atmosphere through an induced draft fan and stack, not shown. Air heated in the airheater A flows through ducts 47 and 28 to air nozzles 11 and furnace F.

Saturated steam collected in steam and water drum 40 is conducted to low temperature superheater section S2 by way of connecting tubes 48 and inlet header 49. After having absorbed a predetermined amount of heat from the gases the steam is conducted to the high temperature section S1 by way of pipe 50 from whence the steam passes through outlet header 51 to a steam turbine (not shown). Having given up some of its energy in a high pressure stage of the turbine the steam is returned to the reheater R to be reheated at a lower pressure. The reheated steam thereupon is returned to a low pressure stage of the turbine for final extraction of energy.

The present invention provides means for burning comminuted, liquid or gaseous fuel in a horizontal tangential manner. For this purpose burner nozzles 10 and air nozzles 11 are alternately arranged in horizontal rows. In the preferred embodiment of Figs. 1 and 2 two rows of fuel nozzles 10 and air nozzles 11 are provided in each front wall 12 and the rear wall 14 of the furnace. More than two rows, or only one row in one wall and two rows in the opposite wall could be used. Nozzles 10 and 11 are adapted for tilting in a vertical plane as shown in detail in Figs. 3 and 4. Thus the fuel nozzle 10 which is shown in a horizontal position can be tilted about an axis 52 by arm 54 which, by being operatively connected through rod 56, bolt 57 and arm 58 to motor means 60, permits the increasing or decreasing of the angle of tilt of nozzle 10 with the horizontal H.

The normal tilting range is usually 30° above and 30° below the horizontal H, or a total of 60°. However, this tilting range can be increased or decreased by switching the connection between arm 58 and rod 56 to any one of the holes 62 in arm 58, four such holes being shown in Fig. 3. In this manner the effective length of arm 58 can be increased or decreased thereby increasing or decreasing, respectively, the tilting range of nozzle 10.

Furthermore to permit the raising or lowering of the entire tilting range of the fuel nozzle 10 within the furnace, a slot 64 is provided at the lower end of rod 56 to permit the shortening or lengthening of the effective length of rod 56. Thus for a given angular movement of arm 58, a shortening of rod 56 will permit an increase of the tilting angle T2 above the horizontal H and a corresponding decrease of the angle T1 below the horizontal H. Or a lengthening of the effective length of rod 56 will increase the angle T1 and decrease the angle T2. To facilitate such adjustments the bolt 57 is provided with a shoulder 66 against which the bolt 57 can be tightened, leaving arm 58 free to rotate in hole 62.

In the preferred embodiment of Figs. 1 and 2, each nozzle 10 is provided with the above described linkage for tilting. My invention of course could also be practiced in an organization wherein only selected nozzles are equipped for tilting and others are stationary.

Figures 4, 7:
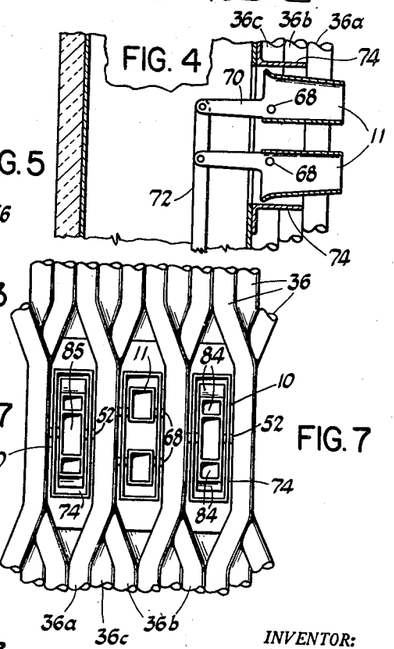
Fig. 4 is an enlarged elevational section through the air nozzles as mounted in the furnace wall, when taken on line 4—4 of Figs. 2 and 6.
Fig. 7 is a partial inside view of a portion of the furnace wall showing the water wall tubes bent around the fuel and air openings; when viewed from line 7—7 of Figs. 1 and 6.

The rows of nozzles shown in the preferred embodiment of Figs. 1 and 2 include air nozzles 11 alternately arranged with fuel nozzles 10. Nozzles 11 are adapted for tilting in a similar manner as are nozzles 10. As shown in Fig. 4, a pair of nozzles 11 are provided, each nozzle pivotally mounted for tilting about a pivot 68 by means of arm 70 and bar 72 and other linkage elements, not shown, but similar to those employed in connection with fuel nozzle 10. Adjustment of the tilting range of air nozzle 11 is also provided in a manner similar to that shown and described for fuel nozzle 10. Obviously other suitable devices well known in the art could be used to accomplish controlled nozzle tilting.

Figure 6:
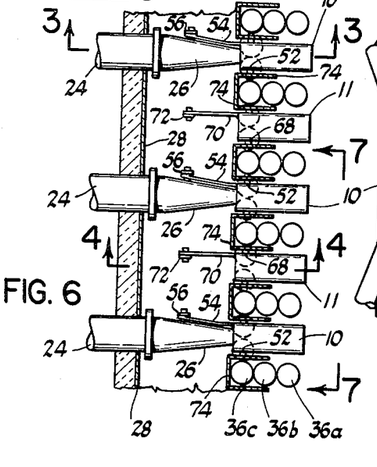
Fig. 6 is a plan section of a portion of the furnace wall when taken through the burner and air openings, on line 6—6 of Figs. 1 and 2.

Figs. 6 and 7 show a plan section and an elevational view of the furnace wall portion through which the fuel and air nozzles 10, 11 pass. For this purpose openings are provided in the tubular water wall lining of the wall by bending suitable portions of tubes 32 out of the way to form openings for accommodating fuel and air nozzles 10, 11. In the preferred embodiment shown in Fig. 7 two tubes 36a and 36b for example, are bent aside and brought in line and in front of tube 36c. In this manner an opening equal to the approximate width of two tubes is made available for nozzles 10 and 11. A burner casing 74 is provided which is attached to the tubes 36 in any suitable manner and on which are supported the burner nozzles 10 and air nozzles 11 by means of pivots 52 and 68, respectively.

Although in the preferred embodiment herein shown the water wall tubes 36 are disposed in vertical parallel positions, suitable openings for horizontal rows of fuel and air nozzles 10, 11 could be provided with equal facility in furnace walls lined with horizontally disposed tubes.

It is well known in the operation of furnaces having walls lined with fluid cooled tubes, that the amount of heat absorbed by these cooled walls can be increased or decreased by lowering or raising, respectively, the mass of burning gases such as, for example, by tilting the burners. It is also well known in the operation of water cooled furnaces equipped with tangential firing that the heat absorption of the furnace walls can be increased or decreased by increasing or decreasing, respectively, the imaginary firing circle towards which the fuel and air streams are tangentially directed. By increasing or decreasing the heat absorbed by the walls in this manner the temperature of the gases leaving the furnace is decreased or increased, respectively, which affords a convenient method of decreasing or increasing, respectively, the temperature of the superheated steam, since more or less heat is thereby made available to the superheater. Horizontal turbulent firing as disclosed herein is particularly well adapted for control of superheated steam temperature by raising or lowering the gas mass, or by increasing or decreasing the firing circle.

It was found when operating with vertical tangential firing as heretofore practiced in the art, that the inequality of the distribution and temperature of the gases leaving the furnace is intensified when tilting the burners upward to obtain a higher superheated steam temperature, or when increasing the firing cylinder diameter to obtain a lower superheated steam temperature. This frequently results in the overheating of the tubes of the superheater such as S1 that are located in the gas zone having a higher temperature of mass flow (pounds of gas per square foot of flow area per hour).

Figure 8:
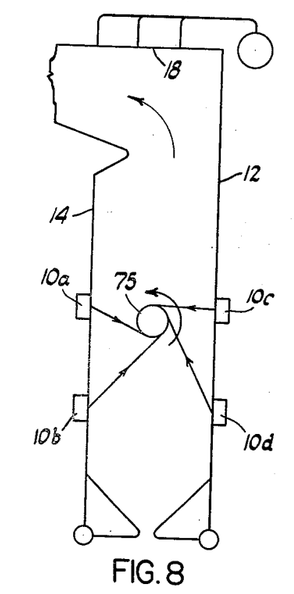
Figs. 8 and 9 are diagrammatic representations of an elevational section through the steam generator shown in Fig. 1 illustrating how the gas mass is raised or lowered, respectively, in the furnace by tilting the burners.
Figure 9:
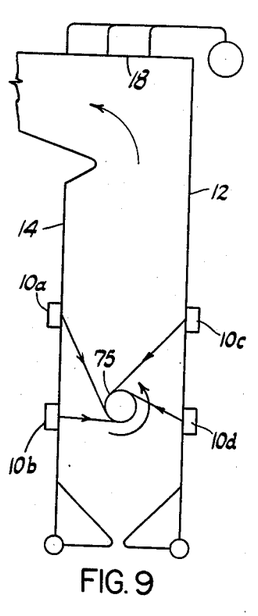
Figure 10:
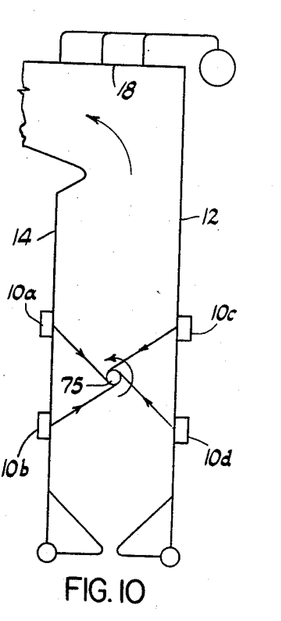
Figure 11:
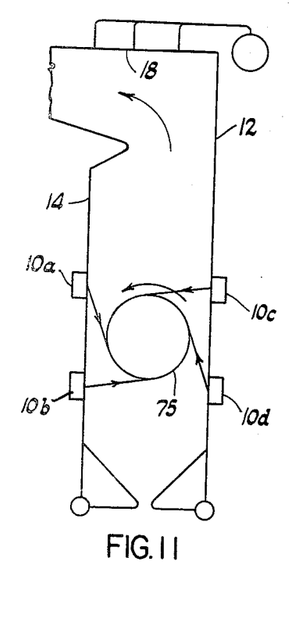

My invention avoids this disadvantage. By employing horizontal turbulent firing, uniform gas temperature or mass flow across the furnace outlet can equally well be achieved when tilting the burner nozzles 10a, 10b, 10c, and 10d, to raise the gas mass as shown in Fig. 8; or when tilting the said burner nozzles to lower the gas mass as shown in Fig. 9. Furthermore, such uniformity of gas temperature is not affected when increasing or decreasing the diameter of the firing cylinder 75 as illustratively shown in Figs. 10 and 11, respectively.

Figure 12:
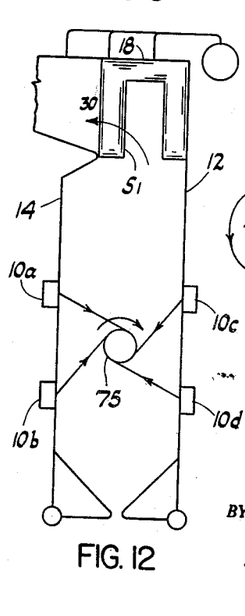
Fig. 12 diagrammatically shows a steam generator similar to that of Fig. 1 with the fuel and air streams directed to cause rotation of the gases in opposite direction (clockwise) from that indicated in Fig. 1.

While the burners in the organizations shown in Figs. 1, 8, 9, 10 and 11, are arranged to discharge fuel and air streams in directions tangential to an imaginary firing cylinder 75 causing rotation of the gases in counterclockwise direction, these burners could also be arranged to cause rotation of the gases in a clockwise direction. Under certain operating conditions, such clockwise rotation may be desirable since then the front wall 12, more specifically the upper portion thereof, will be more effective in absorbing heat from the gases at the region where these gases are about to leave the furnace chamber to enter the horizontal gas offtake 30, as illustratively shown in Fig. 12. Changing the directing of rotation of the gases in horizontal tangential firing, as disclosed herein, will not affect the uniformity of the gas temperature across the furnace outlet 30 as is the case when firing a furnace in a vertical tangential manner.

Figure 13:
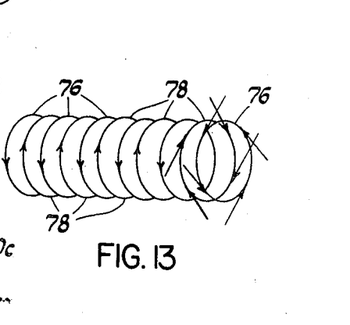
Fig. 13 shows in diagrammatic form how each individual set of 4 burner nozzles can be adapted to alternately produce oppositely directed rotation of the gases for greater turbulence.

Furthermore, my invention possesses great flexibility in operation in as much as alternate sets of four burners such as 10a, 10b, 10c, and 10d, can be directed to rotate the gases counterclockwise as indicated by firing circles 76 in Fig. 13, and the remaining sets of burners can be directed for rotation of gases in clockwise direction as indicated by firing circles 78. Great turbulence and rapid and complete combustion is achieved without disturbing the uniform temperature pattern across the furnace outlet 30.

Figure 14:
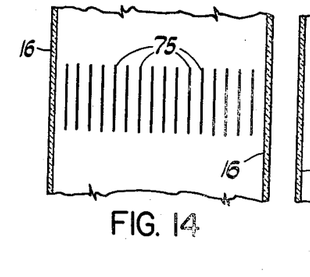
Fig. 14 is an elevational view taken on line 14—14 of Fig. 1 and shows in diagrammatic form the imaginary firing circles which indicate the form the burning rotating gas mass will take when all streams of fuel and air are directed tangentially toward firing circles of equal diameter.
Figure 15:
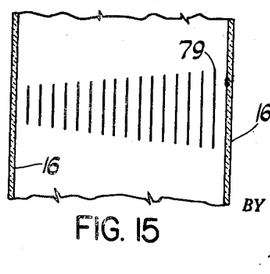
Figs. 15, 16, 17 and 18 show elevational views similar to that of Fig. 14, wherein by judiciously changing the direction of firing of selected fuel and air nozzles, the form of the rotating gas mass can be changed to that of differently shaped bodies of revolution for the purpose of accommodating special operating conditions.
Figure 16:
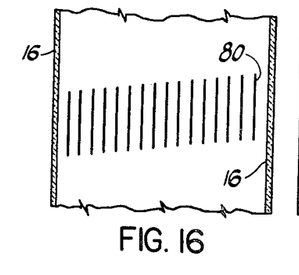

Another important feature of my invention is an unusual inherent flexibility in meeting various heating surface designs and operating conditions. Fig. 14 shows in diagrammatic form the cylindrical shape of the rotating mass of gases which results from directing the streams of fuel and air tangentially towards firing circles of equal diameters. Design conditions, such as heating surface distribution, may require that the gas temperature be higher on one side of the furnace outlet than on the other. Thus my invention also contemplates the tilting of each set of our burners 10a and 10b (in the rear wall) and 10c and 10d (in the front wall), in such a manner that the revolving mass of gases form a body of revolution which does not necessarily take the shape of a cylinder but could take the shape of a frustum of a cone the larger diameter base 79 being disposed adjacent either the right hand side wall of the furnace or the left hand side wall, the former illustratively being shown in Fig. 15. Or the tilting of burner nozzles could be organized in such a manner that the body of revolution is disposed within the furnace in a slanting position with one end 80 being located at a higher elevation than the other, such as diagrammatically shown in Fig. 16. The arrangements shown in Figs. 15 and 16 may be desirable under operating conditions when more heat must be absorbed by one side wall than by the other.

Figure 17:
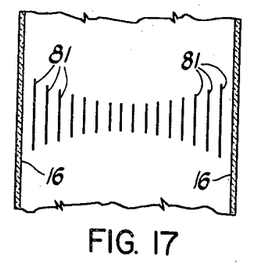

It is also desirable under certain operating conditions to take into consideration that the gases rising in the immediate neighborhood of the furnace walls are cooled to a greater extent than the gases which remain near the center of the furnace. This can be compensated for by arranging the firing direction of each set of burners 10a, 10b, 10c and 10d in such a manner that the outer sets of burners, those located nearer the side walls discharge streams of fuel and air in directions tangential to a larger firing circle 81 than those burner sets which discharge streams of fuel and air for burning nearer or in the central portion of the furnace chamber. Such an arrangement is shown in Fig. 17.

Figure 18:
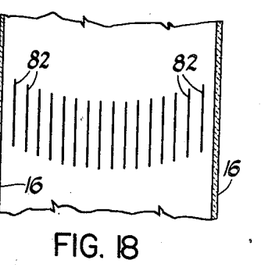

Or the sets of burners located in the outer periphery of the furnace width discharge fuel and air streams in directions tangential to firing circles 82 which are raised to a higher elevation than the firing circles to which the fuel and air streams are directed of the burners located adjacent the central portion of the furnace chamber. Such an arrangement is illustratively shown in Fig. 18.

In fact, my inventive apparatus and method of firing comminuted fuel possesses such great flexibility that any condition of heating surface arrangement or operation can be met to obtain uniform distribution of the gases across the furnace outlet 30 and equal or controlled unequal heat absorption by the heating surfaces disposed adjacent or beyond the furnace outlet 30. Thus a great number of "bodies of rotation" besides those illustratively shown in Figs. 14, 15, 16, 17, and 18, may serve as the target for the streams of fuel and air tangentially directed towards the periphery thereof. Necessary adjustments to diameter of firing circles as well as to the relative elevation thereof within the furnace chamber can readily be accomplished in a convenient manner and during operation of the unit by means of the adjusting features shown in Figs. 3 and 5, as earlier herein described. Arms 58 could be mounted on a single motor driven shaft 83; or two such shafts and motors could be used each controlling a group of nozzles. As shown in Fig. 2 each nozzle, according to my invention, is equipped with its own individual tilting devices and drive.

Furthermore, although in the preferred embodiment of Figs. 1 and 2, I have shown separate air nozzles 11 alternately arranged between fuel nozzles 10, under certain operating conditions these air nozzles could be omitted and the secondary air discharged into the furnace solely through passages 84 (see Fig. 3) provided in nozzle 10 above and below the fuel admission ports 85.

Figure 19:
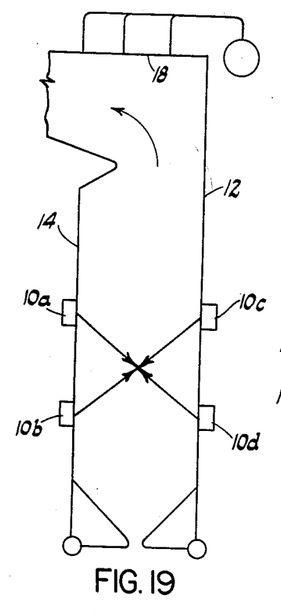
Fig. 19 is a diagrammatic sectional elevation of a steam generator equipped with my inventive horizontal burner system in which the fuel and air streams are directed head on causing great turbulence without rotation of the gas mass.
Figure 20:
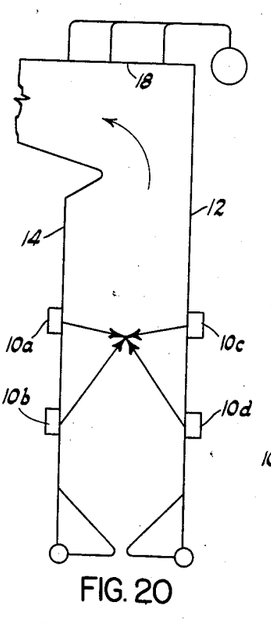
Figs. 20 and 21 illustrate diagrammatically how the gas mass thus produced in the embodiment of Fig. 19 can be shifted into the upper portion of the furnace or into the lower portion of the furnace.
Figure 21:
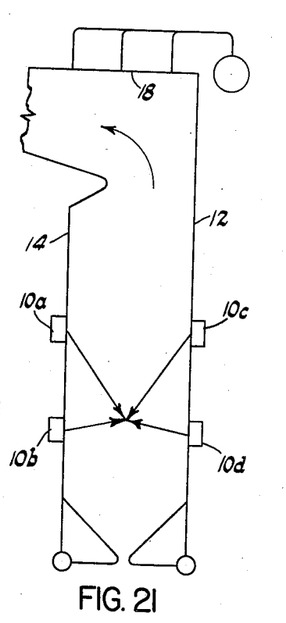

The herein disclosed invention also contemplates arranging the direction of fuel and air streams issuing from burners 10a, 10b, 10c, and 10d, in such a manner that head-on collision occurs between the opposing streams, as shown in Fig. 19. Furthermore, these streams can be tilted up, as shown in Fig. 21 for the purpose of controlling the heat absorption in the furnace walls and as a consequence thereof, the temperature of the superheated steam.

Figure 22:
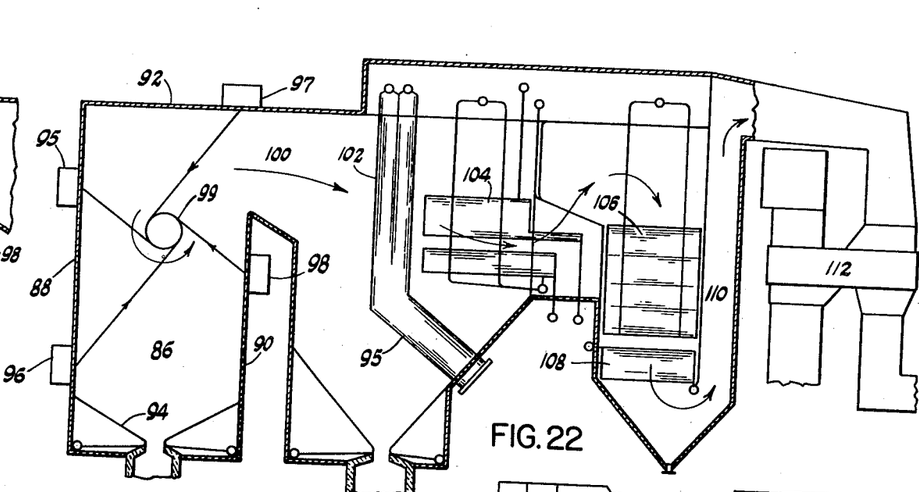
Fig. 22 shows another embodiment of my invention wherein my improved tangentially fired furnace is employed in conjunction with a low-head, horizontally arranged steam generator.

The herein disclosed invention can be applied with particularly favorable results to a steam generator design of horizontal disposition and low head room. Such an arrangement is shown in Fig. 22. In this design there is shown a furnace chamber 86 bounded by front wall 88, rear wall 90, and roof 92. A furnace floor 94 is provided for the discharge of ash in either liquid or solid form. All the walls, roof and floor of the furnace are lined with water-cooled steam generating tubes. Burners, forming rows similar in construction to those described earlier in connection with the embodiment of Figs. 1 to 7, are located at various points of the furnace chamber envelope. In the illustrative embodiment of Fig. 22 are shown four rows of burners. Two rows 95 and 96 are disposed in the front wall 88, one row 97 in the roof 92 and one row 98 in the rear wall 90. These burners discharge fuel and air for burning in directions tangent to the periphery of an imaginary body of revolution 99.

Figure 23:
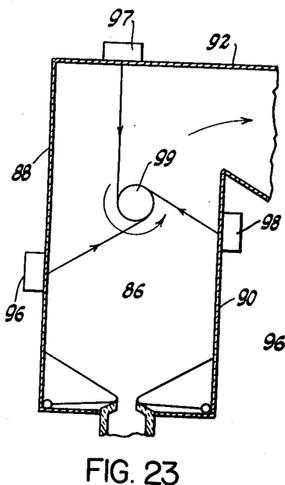
Fig. 23 is a diagrammatic representation of a furnace chamber similar to that shown in Fig. 22, using however only three rows of burner nozzles in the furnace envelope to cause rotation of the gases, instead of four.

In Fig. 23 there is shown an arrangement wherein one burner row 95 is omitted since three rows are sufficient to create a rotating horizontal mass of gases when the streams of fuel and air are directed toward the periphery of the imaginary body of revolution 99. Thus, in the arrangement shown in Fig. 23 burner rows 96, 97, and 98, have been rearranged with row 95 in the front wall being omitted.

After leaving the furnace chamber 86 by way of a horizontal gas offtake 100, the gases pass in direction of the arrows over steam heating surfaces 102, 104, 106, and economizer 108, enter vertical gas pass 110 and flow through air heater 112 into the atmosphere by way of an induced fan and stack (not shown).

My design of horizontal tangential firing offers important advantages over the conventional design of tangential vertical firing when applied to a steam generator designed for low head room such as that shown in Fig. 22. In a conventional vertical tangentially fired furnace a considerable volume of the furnace chamber must be provided above the burners in order to allow the gases to change the flow characteristic from rotating to straight line laminated flow. When firing fuel in the horizontal tangential manner in accordance with the present invention, the height of the furnace chamber can be considerably reduced over that required with vertical tangential firing without causing unequal distribution of the furnace gases and unequal distribution of the furnace heat and gas temperatures across the furnace outlet 100. Accordingly my inventive method and apparatus for tangential horizontal firing permits a design of a low head boiler that promises to be more economical in space and construction costs as well as more efficient in operation, than a low head boiler designed for vertical tangential firing in the conventional manner.

Figures 24, 25:
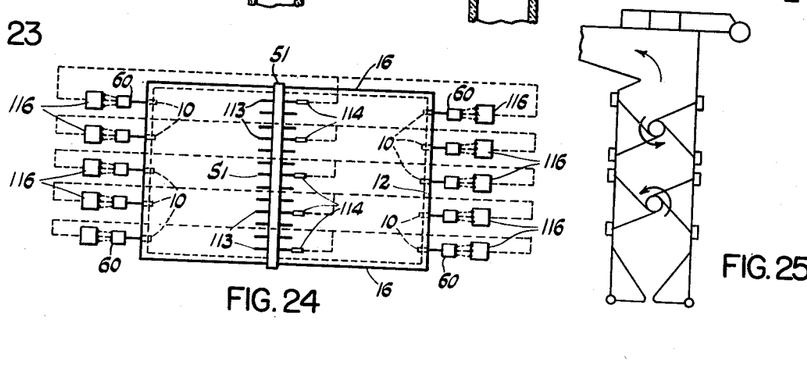

In Fig. 24 is shown a plan view of an arrangement wherein the tilt of each fuel nozzle 10 is individually controlled in response to the steam temperature for the purpose of maintaining the steam temperature constant. More specifically such temperature reading is taken at each or selected superheater elements that correspond to the location of respective nozzles with relation to the side walls. Accordingly, each superheater element 113 of superheater S1, or a selected number thereof (see Figs. 1 and 24) is equipped with a thermostat 114 preferably near the steam outlet header 51 of the superheater S1. Variations of steam temperature are received through conductors 115 by a transmitter 116 and translated into suitable impulses which cause motor means 60 to raise or lower in well known manner the burner nozzles 10 of each set of nozzles (for example 10a, 10b in rear wall, 10c and 10d in front wall, see Fig. 8). Thus a rise in steam temperature will result in a lowering of the burner tilt and a drop in steam temperature will cause a raising of the rotating gas mass within the furnace by an upward tilt of the respective burner nozzles 10.

For example, if one side wall 16 of the furnace should become less effective in absorbing heat due to slag accumulation thereon, the steam temperature would rise in the superheater elements adjacent that wall. This rise of steam temperature sensed by the respective thermocouple 114 could cause an impulse to be received by transmitter 116 which would act on corresponding motor means 60 to only lower those burner nozzles or nozzles 10 that are located adjacent the side wall which is affected by the slagging condition. Depending on the temperature impulses received a gradual lowering of the burner nozzles as the slagging wall is approached may be the result, producing the pattern illustratively shown in Fig. 16 where the lower heat absorption of the left hand wall 16 is compensated for by a gradual downward tilt of the nozzle approaching that wall.

In the above manner any temperature trend recorded by the row of thermostats 114 would immediately be reflected in a corresponding pattern of tilting calling for a shifting of the firing configuration (either a change of elevation or change of firing circle diameter) which would act to reestablish uniform temperatures or heat absorption across the gas outlet and uniform steam temperatures across the superheater elements 113.

Figure 26:
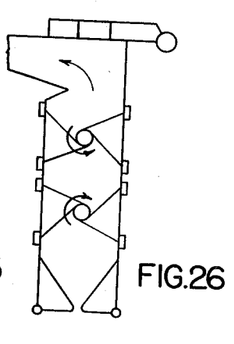

Although I have herein disclosed a horizontal tangential firing system producing only one body of rotating burning gases within the furnace chamber, it is within the purview of my inventive concept to make use of two or even several of such rotating gas masses within one furnace, if design and operating conditions should make such use desirable. Figs. 25 and 26 show furnaces wherein my inventive horizontal tangential fuel firing system is employed to produce two rotating bodies of gas within one furnace chamber. In Fig. 25 both masses 120 and 122 route in the same direction (counterclockwise) and in Fig. 26 the upper mass 124 rotates in counterclockwise direction where as the lower mass 126 rotates in a clockwise direction. Obviously the rotational directions can suitably be reversed depending on the operation conditions that have to be met.

It is of course to be understood that various other arrangements and combinations are possible in which my inventive horizontal firing method and apparatus could be employed to great advantage.

Therefore, while I have illustrated and described several preferred embodiments of my invention, it is to be understood that such are merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:
1. The method of operating an elongated water-cooled furnace fired with comminuted fuel and having a combustion chamber defined by four upright walls, a gas offtake opening at one end of said chamber, and a pair of spacedly arranged and substantially horizontal rows of burners disposed in each of two opposing said chamber walls for discharging into said furnace chamber through said burner rows in opposite walls thereof streams of fuel and air in directions tangentially to an imaginary body of revolution, comprising the steps of producing a mass of burning gases revolving about a generally horizontal axis of revolution that is parallel to one of said opposing walls and to said gas offtake opening; and displacing said axis of revolution from said horizontal and parallel disposition by selectively and individually changing the tangential directions of said streams to cause said axis of rotation to assume a slanting position with respect to said opposing walls and said revolving gas mass to approach or recede respectively, from a selected portion of said opposing walls so as to increase or decrease the heat absorption of said wall portion and to decrease or increase the temperature of the gases across said gas offtake as the gases leave said furnace chamber; and flowing said mass of gases toward and through said gas offtake in a direction generally parallel to the upright walls other than the said opposing walls.

2. The method of controlling and equalizing the heat content of the combustion gases leaving the outlet of an upright furnace chamber which gases normally show unequal heat distribution across the width of said outlet, said furnace chamber being defined by water-cooled front, rear and right and left side walls and having means for discharging streams of fuel and air into said furnace chamber from a plurality of points spacedly arranged along each of two parallel and vertically spaced horizontal rows in the front wall and each of two parallel and vertically spaced horizontal rows in the rear wall, said outlet being located in the upper end of said chamber and extending in a direction parallel to said front and rear walls, comprising the steps of directing said streams of fuel and air tangentially towards a plurality of imaginary firing circles, each circle lying in a substantially vertical plane and serving as the target of a set of four specific fuel and air streams each stream exclusively originating from one of said four horizontal rows; and altering the angle to the horizontal of the directions of select sets of fuel and air streams to alter the diameter of the firing circles thereof, so as to increase the firing circles that correspond to a flow of gases of high heat content when leaving the furnace outlet, and decrease the firing circles that correspond to a flow of gases of low heat content when leaving the furnace outlet, whereby to make the heat content of the gases uniform across the width of said outlet between said side walls.

3. The method of controlling and equalizing the normally non-uniform heat content of the combustion gases leaving the outlet of a furnace chamber that is defined by water-cooled front, rear and right and left side walls said chamber having means for discharging streams of fuel and air into the interior thereof from a plurality of points spacedly arranged along each of two parallel and vertically spaced horizontal rows in the front wall and each of two parallel and vertically spaced horizontal rows in the rear wall, said outlet extending between said side walls, comprising the steps of directing said streams of fuel and air tangentially towards a plurality of imaginary firing circles, each circle lying in a substantially vertical plane and serving as the target of a set of four specific fuel and air streams each stream exclusively originating from one of said four horizontal rows; and altering the directions of selected sets of fuel and air streams to reverse the direction of rotation of the gases that are generated by the burning of said selected sets of fuel and air streams with respect to the direction of rotation of other sets.

4. The method of controlling the temperature of the combustion gases leaving a steam generating and steam heating apparatus having an elongated upright furnace defined by at least parially water-cooled front, rear and side walls and means forming a generally horizontal gas offtake opening disposed in the rear wall adjacent said roof and extending between said side walls, and having means for dischaging streams of fuel and air into the furnace from a plurality of burners forming at least two horizontal rows spaced one from the other in each of said rear and front walls said stream being directed tangentially to an imaginary firing cylinder having a longitudinal generally horizontal axis parallelly disposed with respect to said gas offtake opening; comprising the steps of forming a burning, rotating mass of gases in substantially the shape of a cylinder with the longitudinal axis thereof disposed in a generally horizontal direction, and raising or lowering either the one or the other end of said rotating cylindrical gas mass, by respectively raising or lowering selected tangentially directed streams of fuel and air, whereby to respectively increase or decrease the gas temperature in either the one or the other side of said gas offtake.

5. The method of equalizing and controlling the exit gas temperature of a furnace chamber fired with comminuted fuel said chamber being defined by a water-cooled wall enclosure including a gas offtake opening formed in said enclosure and having means for discharging into said furnace chamber through said enclosure wall a plurality of streams of fuel and air said streams being arranged in at least three horizontal and parallel rows and being tangentially directed to the periphery of an imaginary horizontal firing cylinder comprising the steps of producing from said streams a mass of burning gases revolving about a generally horizontal axis of revolution parallelly disposed with respect to said gas offtake opening, said gases flowing toward said gas offtake in a general direction normal to said axis of revolution; slanting said axis of revolution from said horizontal and normal disposition by correspondingly altering the direction of discharge of said streams to increase or decrease the heat absorption the portion of said wall enclosure that is adjacent the slanted-down end or the slanted-up end, respectively, of said axis of revolution whereby to equalize and control the temperature of the gases across said gas offtake as the gases leave said furnace chamber.

6. The method of controlling and equalizing the heat content of the combustion gases leaving the gas outlet of a water-cooled furnace chamber, said gases normally constituting parallelly flowing and transversely aligned gas layers of relatively high and low heat contents, comprising the steps of discharging streams of fuel and air into said chamber through opposing walls thereon in directions tangential to a plurality of parallelly disposed firing circles to produce a vertically rotating and substantially horizontal elongated body of burning gases having an axis of rotation which extends generally in a direction parallel to said gas outlet and transversely to the direction of the gases flowing through said gas outlet, and lowering or raising respectively, the elevation of the respective portions of said rotating body of gases which produce said gas layers of high or low heat content as the gas stream passes through said gas outlet, whereby to equalize the heat content of the gases leaving said gas outlet.

7. The method of controlling the heat content of the combustion gases leaving a furnace chamber comprising two opposing heat absorbing side walls by way of a gas outlet located between said walls, said gases normally constituting gas layers flowing parallelly to said side walls, the layers adjacent said side walls having a relatively lower heat content than the layers located more remotely therefrom, comprising the steps of discharging streams of fuel and air into said chamber through other opposing walls thereof that are disposed perpendicularly to said side walls to produce a vertically rotating and substantially horizontally elongated body of burning gases having a longitudinal axis which extends generally parallel to said gas outlet and in a direction transversely to the direction of the gases flowing through said gas outlet, and raising the elevation of the portion of said rotating body of gases adjacent said walls, which portions produce said gas layers of low heat content, or lower the elevation of the portions of said rotating body of gases that are located more remote from said walls, which portions produce gas layers of relatively higher heat content, whereby to equalize the heat content of the gases leaving said gas outlet.

8. The method of controlling the heat content of the combustion gases leaving a furnace chamber having a gas outlet located between opposing side walls thereof, said gases normally constituting gas layers flowing parallelly to said walls, the layers adjacent said walls having a relatively lower heat content than the layers located more remotely therefrom, comprising the steps of discharging streams of fuel and air into said chamber through other opposing walls thereof that are disposed perpendicularly to said side walls to produce a vertically rotating and substantially horizontal cylindrical body of burning gases having a longitudinal axis which extends generally parallel to said gas outlet and in a direction transversely to the direction of the gases flowing through said gas outlet, and increasing the diameter of the portions of said rotating body of gases adjacent said walls which portions produce said gas layers of low heat content, or decreasing the diameter of the portions of said rotating body of gases that are located more remote from said walls, which portions produce gas layers of relatively higher heat content, whereby to equalize the heat content of the gases leaving said gas outlet.

9. The method of controlling the temperature of the gases leaving an upright water cooled furnace chamber that is defined by front, rear, side walls and roof and having a gas outlet in the upper rear wall thereof comprising the steps of discharging streams of fuel and air into said chamber through the opposing front and rear walls thereof to produce a plurality of vertically rotating and substantially horizontal elongated bodies of burning gases having longitudinal axes which extend generally parallel to said gas outlet and in directions transversely to the direction of the gases flowing through said gas outlet, and lowering or raising respectively, the elevation of at least one of said rotating bodies of gases to lower or raise the temperature of the gases leaving said outlet.

10. The method as defined in claim 9 wherein adjacent bodies of burning gases are being rotated in opposite directions of rotation.

11. The method as defined in claim 9 wherein adjacent bodies of gases are being rotated in the same direction of rotation.

12. The method of controlling and equalizing the heat content of the combustion gases leaving a furnace chamber having upright water cooled walls including two opposing walls and a gas outlet disposed in parallel relation thereto, said furnace being fired by vertically tiltable burners mounted in horizontal rows in said opposing walls and discharging fuel and air in streams tangential to a plurality of imaginary vertical firing circles being horizontally spaced, some portion of said gases having a lower or higher heat content by virtue of having been cooled by said water cooled walls to a degree larger or smaller than other horizontally adjacent portions, comprising the steps of decreasing the heat absorption of that furnace portion through which said gases of low heat content have passed and increasing the heat absorption of that furnace portion through which said gases of high heat content have passed, by raising, respectively lowering the tilt of those burners which are discharging fuel and air into the respective furnace portions, whereby to control and equalize the heat content of the combustion gases across the horizontal width of said gas outlet.

References Cited in the file of this patent

UNITED STATES PATENTS

| | | |
|---|---|---|
| 1,792,104 | De Lorenzi | Feb. 10, 1931 |
| 2,363,875 | Kreisinger et al. | Nov. 28, 1944 |
| 2,861,526 | Kuppers | Nov. 25, 1958 |